(No Model.) 2 Sheets—Sheet 1.

T. E. BISSELL & G. R. THOMSON.
DISK HARROW.

No. 588,383. Patented Aug. 17, 1897.

Witnesses
G. M. Neff.
W. E. Clendaniel.

Inventors
Torrance E. Bissell
and George R. Thomson
by Ridout & Maybee
Atty's (No Model.) 2 Sheets—Sheet 2.

T. E. BISSELL & G. R. THOMSON.
DISK HARROW.

No. 588,383. Patented Aug. 17, 1897.

Witnesses
J. N. Neff
H. E. Clendaniel.

Inventors
Torrance E. Bissell
and George R. Thomson
by Ridout & Maybee,
Att'ys

UNITED STATES PATENT OFFICE.

TORRANCE E. BISSELL, OF PRESCOTT, CANADA, AND GEORGE R. THOMSON, OF GOUVERNEUR, NEW YORK.

DISK HARROW.

SPECIFICATION forming part of Letters Patent No. 588,383, dated August 17, 1897.

Application filed February 5, 1897. Serial No. 622,151. (No model.) Patented in Canada June 4, 1895, No. 49,095.

*To all whom it may concern:*

Be it known that we, TORRANCE EDWARD BISSELL, manufacturer, of the town of Prescott, in the county of Grenville and Province of Ontario, Canada, and GEORGE RODGER THOMSON, manufacturer, of Gouverneur, in the county of St. Lawrence and State of New York, have invented certain new and useful Improvements in Disk Harrows, (for which we have obtained a patent in Canada, No. 49,095, dated June 4, 1895,) of which the following is a specification.

The object of our invention is, first, to improve the means of adjusting the angle of the gangs; second, to improve the connection between the cross-beam and the gangs; third, to provide simple ball-bearings to relieve the draft and the endwise thrust of the gangs; fourth, to provide simple and easily-operated scrapers for the disks; and it consists, essentially, in the construction of the parts, as hereinafter more particularly described.

Figure 1:
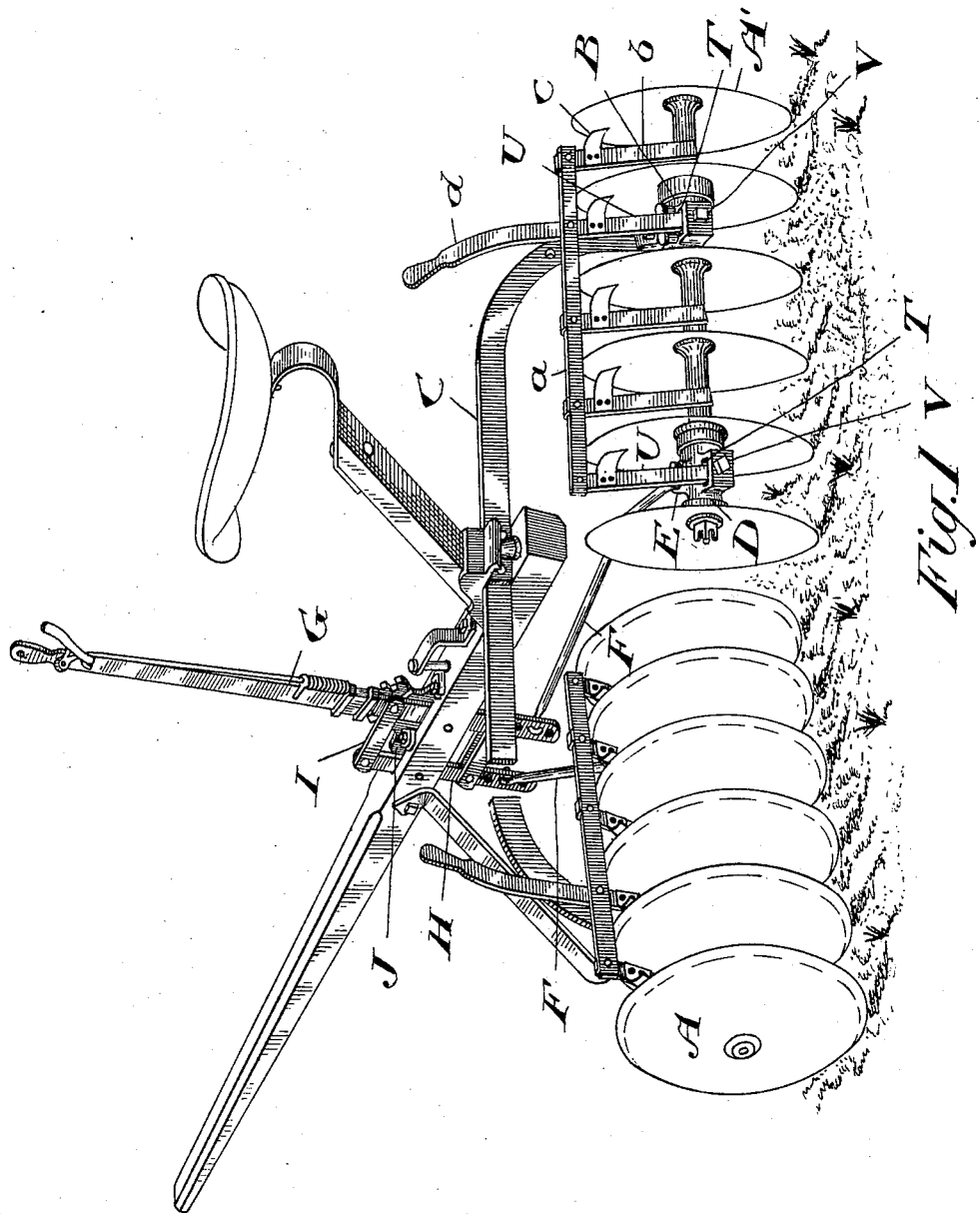
Figure 2:
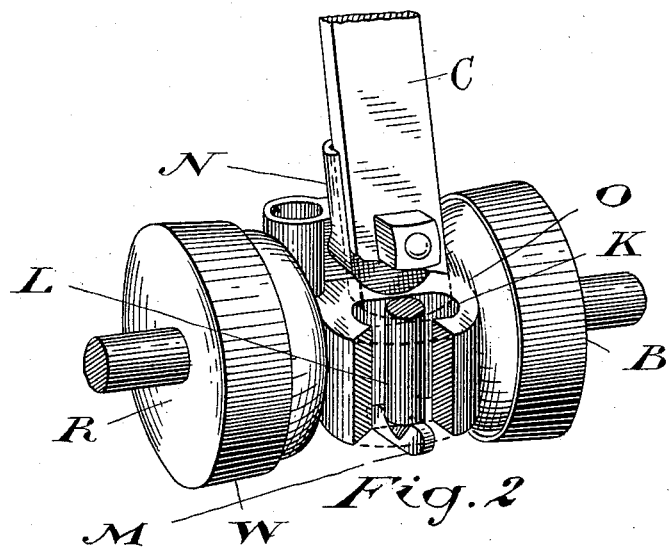
Figure 4:
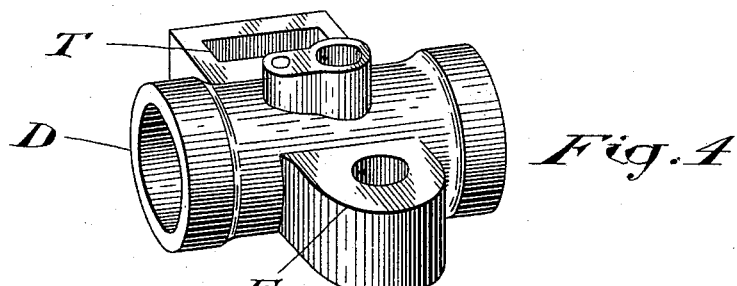
Figure 3:
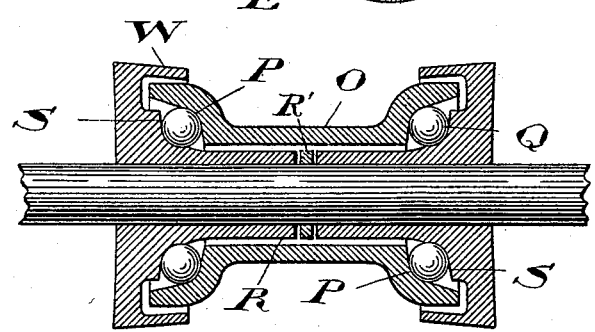

Figure 1 is a perspective rear view of a disk harrow provided with our improvements. Fig. 2 is a perspective detail, partially in section, showing the means of connecting the cross-beam to the gangs. Fig. 3 is a longitudinal section of the bearing shown in Fig. 2. Fig. 4 is a perspective detail of the inner bearing-box of a gang.

In the drawings like letters of reference indicate corresponding parts in the different figures.

A A' are the disk gangs, which are put together in substantially the usual manner.

B are the outer bearings of the gangs, to which the cross-beam C is connected in the manner hereinafter more particularly described.

D are the inner bearings into eyes E, on the front side of which the connecting-rods F are hooked. The forward end of the connecting-rod F of the disk gang A' is hooked into one of the holes in the lower end of the hand-lever G, pivoted on the tongue of the machine. The forward end of the other connecting-rod F is similarly connected to the lower end of the supplemental lever H, similarly pivoted. This lever is connected by one or more links I to the hand-lever G, so that when the lever G is adjusted the lever H partakes of its motion. This supplemental lever is necessitated by the fact that it is desirable to have the connecting-rods of the same length, and as one of the disk gangs is set eight inches in advance of the other it is necessary that the point of connection of its rod F should be eight inches in advance of the point of connection of the similar rod of the rearward gang. By so setting the gangs they can be brought closely together without clogging, and no center ridge will be left uncut, as is the case when the gangs are set opposite to one another.

It will be noticed that the casting of the quadrant J of the adjustable hand-lever G is carried forward so as to take the pressure of the upper end of the lever H when the strain of the gang A comes upon the lower end.

It will be noticed that several holes are provided in the lower ends of the levers G and H, so that the angle of each one of the gangs may be altered independently of the other gang by inserting its connecting-rod into a higher or lower hole on the end of the lever to which it is connected. This is a valuable feature when working on rolling fields or side hills, when it is necessary that one gang should have a greater cutting angle than the other in order to hold the machine in place against the inclined ground on which it is working.

We do not confine ourselves to this construction, as similar results may be obtained by omitting the link connecting the levers below the pole and providing the link connecting the levers above the pole with a series of holes. By changing the connecting-point between the levers and link the relative angle of the gangs is thereby controlled and varied at will of the operator.

Upon the forward side of the outer bearing B of each disk gang a lug is formed having an oblong hole K formed therein. The lower end of each downward extension of the cross-beam C is rounded at L, as shown. At the lower extremity of this rounded end a flattened head M is forged or otherwise suitably formed or connected at an angle to the cross-beam. (See Fig. 2.)

From this construction it will be seen that when the gang is turned so that the length of the hole K corresponds with the length of the flattened head M the end of the cross-beam may be passed through the hole, and that when the gang is turned into working position, as shown in Figs. 1 and 2, that the cross-beam will be securely held in connection with the bearing B, the flattened head lying across the hole K effectually preventing its withdrawal.

Securely attached to the cross-beam C is a casting N, having its lower side rounded and resting on top of the journal-box O of the bearing B. This casting supports the whole weight of the cross-beam, the tongue, and the driver, and yet permits of the gang rocking freely in a vertical plane.

Each bearing-box B is preferably constructed as shown in detail in Fig. 3. The journal-box O has a chilled chamber P, formed in each end thereof to receive the friction-balls Q. The journal R is preferably divided at the center and has suitably-shaped shoulders S formed thereon on which the balls Q run.

Between the two halves of the journal a washer R' is placed, which may be removed when the journal-box O becomes shortened by wear. Provision is thus made for altering the length of the journal to compensate for the shortening of the box by wear. Sand-bands W are also connected to the journal R.

As the journal revolves with the axle and disks, while the journal-box O is held stationary by the cross-beam C, it follows that the whole endwise thrust and also the ordinary draft of the gang is taken by the friction-balls Q. As each end of this bearing is precisely of similar construction, the bearing may be reversed or used on the other gang, when so desired, in order to equalize the wear.

The inner bearing-boxes D are of ordinary construction, as shown in Fig. 4, with the exception that each is provided at its rear side with a lug having an oblong slot T formed therein. Similar lugs and slots are formed on the rear side of the bearings B, and scraper-standards U are pivoted therein by means of set-screws V. These standards are pivotally connected together by the scraper-beams a. Rigidly connected to these scraper-beams are the clod-cleaners b, located between each pair of disks. There are three of these clod-cleaners b, rigidly connected to each scraper-beam a, which, with the two pivoted standards U, serve as scrapers to clean the backs of the disks. Of course as the standards U are pivoted they do not move against the backs of the disks in precisely the same way as the rigidly-connected clod-cleaners b, but the difference in practice is not great enough to matter materially. Scraper-knives c are connected to the clod-cleaners b and to the standards U for the purpose of cleaning the inside edges of the disks. A hand-lever d is preferably connected to one of the standards U, by means of which the clod-cleaners may be thrown into and out of operation.

From the above description it will be seen that we have constructed a disk harrow in which the angle of the gangs may be quickly adjusted and in which the cross-beam may be quickly connected to and disconnected from the gangs without the use of tools, and that when so connected the gang, although securely held, is given perfect liberty of changing its angle in both a vertical and a horizontal plane, that the endwise thrust of the disk gangs and also the ordinary draft are effecually relieved, and that simple and easily-operated scrapers have been provided to effectually clean the disks of any mold which may adhere to them.

What we claim as our invention is—

1. In a disk harrow, the disk gangs A, A', pivoted to the cross-beam C, in combination with the hand-lever G, one or more links I, supplemental lever H, and the connecting-rods F, substantially as and for the purpose specified.

2. In a disk harrow, disk gangs A, A', pivoted to the cross-beam C, in combination with the lever G, one or more links I, supplemental lever H, quadrant casting J, and connecting-rods F, substantially as and for the purpose specified.

3. In a disk harrow, a cross-beam having the extremity of its downward ends rounded and a flattened head forged on or connected therewith at an angle to the breadth of the end of the cross-beam, in combination with a disk gang having a journal-box on the axle thereof, the said journal-box having an oblong hole formed in a lug thereon, substantially as and for the purpose specified.

4. In a disk harrow, a cross-beam having its downward end loosely connected with the journal-box of the disk-gang axle, in combination with a rounded projection formed on or connected to the downward end of the cross-beam and resting on the top of the journal-box, substantially as and for the purpose specified.

5. In a disk harrow, a journal-box having chilled ball-chambers at each end thereof, in combination with a divided journal incasing the axle and provided with suitably-grooved shoulders at each end, balls between said journal-box and journal, the said divided journal substantially filling the space, longitudinally, between said shoulders and having its inner edges abutting, whereby all parts of the bearing may be tightened without danger of binding of the parts, substantially as described.

6. In a disk harrow, an axle having harrow-disks thereon and a journal-box having chilled ball-chambers at each end thereof, in combination with a divided journal incasing the said axle and provided with suitably-grooved shoulders at each end, balls between said journal-box and journal, the said divided journal substantially filling the space, longitudinally, between said shoulders and having its inner edges abutting, and means for clamping together the disks and divided journal, substantially as and for the purpose specified.

7. In a disk harrow, scraper-standards pivoted to the journal-boxes of a gang and pivotally connected by a scraper-beam, in combination with scraper-knives connected to the said standards, substantially as and for the purpose specified.

8. In a disk harrow, scraper-standards pivoted to the journal-boxes of a gang and pivotally connected by a scraper-beam, in combination with scraper-knives connected to said standards and a series of clod-cleaners rigidly connected to the said beam between the disks, substantially as and for the purpose specified.

9. In a disk harrow, scraper-standards pivoted to the journal-boxes of a gang and pivotally connected by a scraper-beam, in combination with scraper-knives connected to said standards; a series of clod-cleaners rigidly connected to the said beam between the disks, and a series of scraper-knives connected to the said clod-cleaners, substantially as and for the purpose specified.

10. In a disk harrow, scraper-standards pivoted to the journal-boxes of a gang and pivotally connected by a scraper-beam in combination with clod-cleaners connected to the said beam and a hand-lever rigidly connected to one of the scraper-standards, substantially as and for the purpose specified.

11. In a disk harrow, scraper-standards pivoted in oblong slots formed at the back of the journal-boxes of a gang and pivotally connected by a scraper-beam in combination with clod-cleaners connected to the said beam and a hand-lever rigidly connected to one of the scraper-standards, substantially as and for the purpose specified.

12. In a disk harrow, a cross-beam having the extremities of its downward ends rounded and a flattened head forged on or connected therewith at an angle to the cross-beam in combination with disk gangs having the outer journal-boxes thereof provided with lugs with oblong holes therein; and inner bearing-boxes, to which are attached suitable connecting-rods adjustably connected to the tongue of the harrow, substantially as and for the purpose specified.

13. In a disk harrow, the disk gangs A, A', pivoted to the cross-beam C, in combination with the hand-lever G, one or more links I, supplemental lever H, and the connecting-rods F, both levers being provided with a series of holes to receive the end of the connecting-rods, substantially as and for the purpose specified.

14. In a disk harrow the combination of the journal-box O, chilled ball-chambers P; divided journal R; washer R'; grooved shoulders S; and two sets of friction-balls Q, substantially as and for the purpose specified.

Gouverneur, New York, March 13, 1895.

TORRANCE E. BISSELL.
GEORGE R. THOMSON.

In presence of—
J. H. CARPENTER,
D. H. WILLIAMS.